United States Patent [19]

Turbard et al.

[11] 4,414,818

[45] Nov. 15, 1983

[54] ENVIRONMENTAL CONTROL SYSTEM

[75] Inventors: Alan M. Turbard, Leighton Buzzard; Peter N. Foley, Basingstoke, both of England

[73] Assignee: Borg-Warner Ltd., Letchworth, England

[21] Appl. No.: 354,130

[22] Filed: Mar. 2, 1982

[30] Foreign Application Priority Data

Mar. 5, 1981 [GB] United Kingdom ............... 8107003

[51] Int. Cl.³ ...................... F25D 17/04; G05D 23/00
[52] U.S. Cl. ................................... 62/176.1; 62/238.6; 237/2 B
[58] Field of Search ............ 237/2 B; 62/238.6, 238.7, 62/176.1; 165/29

[56] References Cited

U.S. PATENT DOCUMENTS 4,242,872 1/1981 Shaw ................................... 237/2 B
4,336,692 6/1982 Ecker et al. ........................ 165/29 X Primary Examiner—William E. Wayner
Attorney, Agent, or Firm—Thomas B. Hunter

[57] ABSTRACT

An environmental control system has an evaporator section comprising an evaporator for extracting heat from (and dehumidifying) air destined for the controlled space or for exhaust—this air may be a controlled mixture of fresh and recycled air—and a chiller for extracting heat from a source such as well water and from a thermal store. The heat pump condenser section comprises a condenser for rejecting heat to air entering the space and a condenser receiver for rejecting heat to the store. The system includes a system controller (not shown) programmed to control operation in a manner tending to minimize the prime energy requirement.

5 Claims, 3 Drawing Figures

Fig.3.
OPERATING OF HEAT PUMP SENSING SPACE TEMPERATURE T2
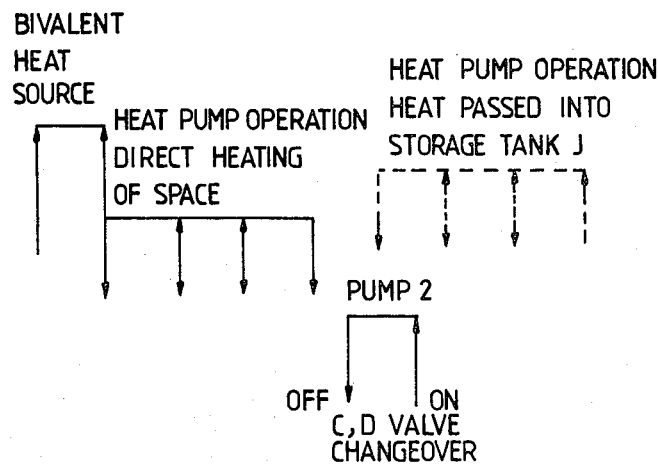
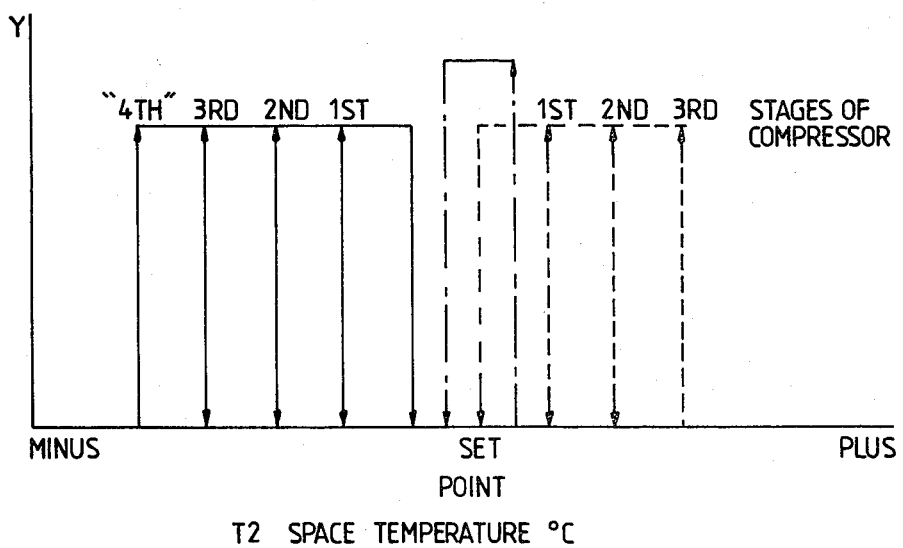
T2 SPACE TEMPERATURE °C

ENVIRONMENTAL CONTROL SYSTEM

DESCRIPTION

The present invention relates to an environmental control system.

Environmental control systems have been proposed which extract heat energy from a suitable source and use it for space heating.

According to the present invention, there is provided an environmental control system including a heat pump having an evaporator section and a condenser section for supplying heat to a controlled space, the evaporator having automatically controlled alternative sources of heat energy for the evaporator. Thus where there are a number of sources of heat energy, the system can select the one which, for a given set of operating conditions permits the most efficient extraction of heat, in a manner such as to optimise the use of prime energy so that in the overall operation of the system the prime energy requirement may be minimised. The sources of heat energy may include:- outside air; air from the controlled space itself (where, as for a greenhouse application, the space air may have a high relative humidity enabling energy to be extracted by dehumidifying the air and thereby recovering the latent heat therein); a heat sink such as an insulated water storage tank, into which excess heat can be stored for later use; or a water source such as a well, river, lake, etc.; and various other sources. The evaporator section may be provided with an evaporator for deriving heat energy from air sources, such as fresh air, space air or a controlled mixture of the two and a liquid chiller for deriving heat energy from the water sources such as the storage tank and the well or the like (if available). Likewise, the condenser section may include a condenser for rejecting heat to a stream of air entering the controlled space and a condenser receiver for rejecting heat to the thermal store.

The invention will be further described by way of example with reference to the accompanying drawings, in which:-

FIG. 3 shows the response of the system of FIG. 1 to deviations from the set-point temperature.

In the following, the invention will be described with reference to its application to the control of the interior of a greenhouse but it will be appreciated that the invention is in no way limited to that application and may indeed be applied to a variety of other environments.

Figure 1:
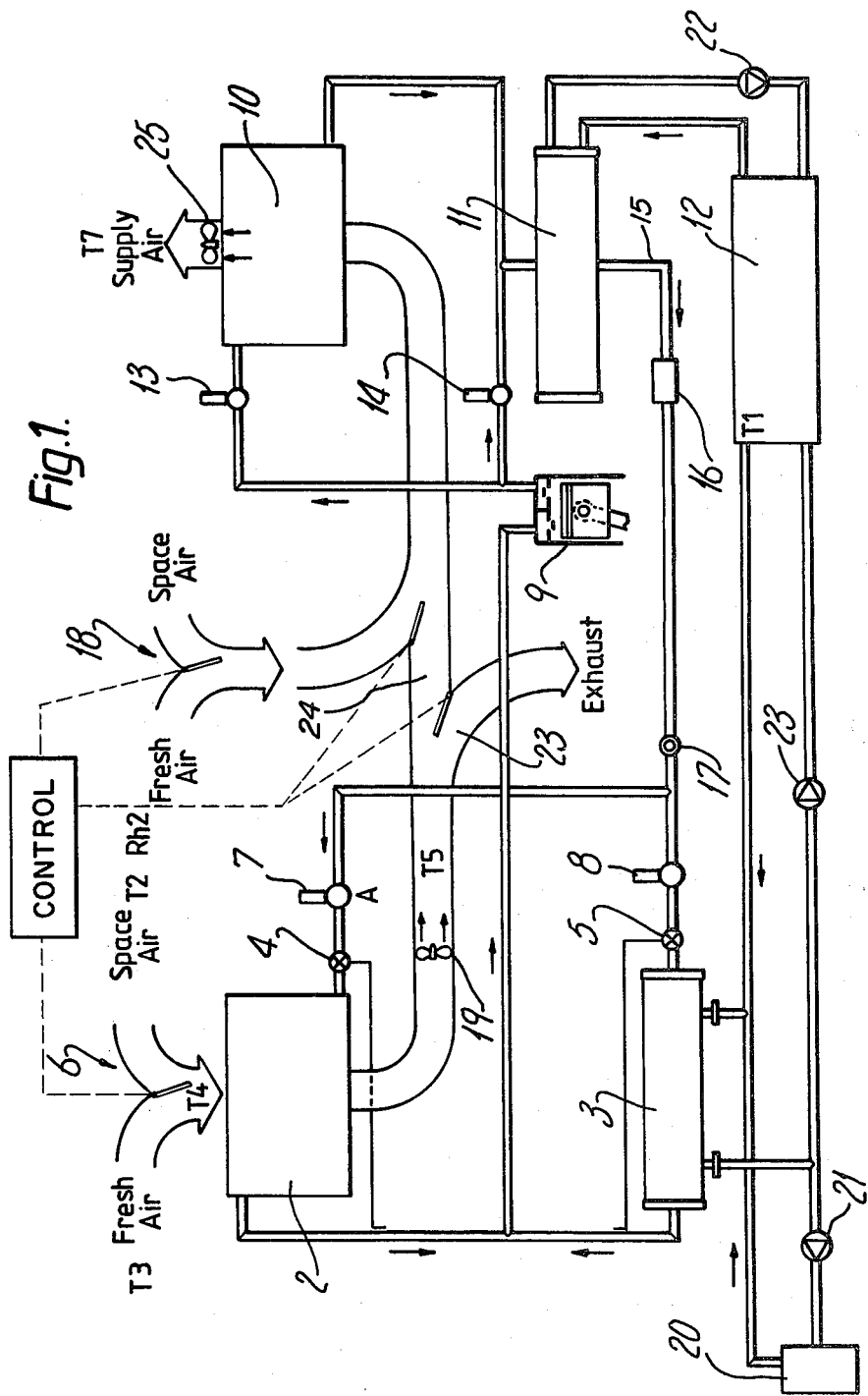
FIG. 1 is a schematic diagram of one embodiment of the invention.

In the illustrated embodiment, the environmental control system generally designated 1 in FIG. 1 is in the form of a complete package entity whereby the air system and water system parts of the refrigeration circuit and the accompanying compatible electronic controls are all mounted within one assembly. The refrigeration system has the capability of reclaiming energy from four basic alternative sources; namely, ambient outdoor air, a waste air stream heavily ladened with moisture, (including a variable mixture of both of these air streams), from an external heat storage water tank or finally from an external water source that could be either a river, pool/lake or artesian well.

The energy is extracted from the said air sources via a conventional air-to-refrigerant heat exchanger such as a copper tubed, aluminium finned multipass evaporator 2 and in the case of the reclamation from the said water sources via a liquid chiller 3 in the form of a conventional shell and tube heat exchanger, the material of the tubes being selected dependent upon the potential water contaminants. Evaporator 2 and chiller 3 have associated with them respective thermostatic expansion valves 4 and 5 to promote the rapid expansion and hence cooling of the liquid refrigerant.

The selection of the air stream (i.e. return air or fresh air) is controlled by automatic selection of an air damper system 6; and the change-over from utilising the air-to-water source of energy is via the selection automatically of appropriate refrigeration liquid line solenoid valves 7 and 8 strategically located adjacent to the appropriate thermostatic expansion valves 4 and 5.

The heat extracting portion of the system just described in regard to evaporator 2 and refrigerant-to-water heat exchanger 3 forms a part of a nonreversible "heating only" heat pump system which includes compressor 9, a refrigerant-to-air heat exchanger or condenser 10 and a liquid-to-refrigerant heat exchanger or condenser/receiver 11, the latter two elements providing the heat rejection side of the system.

In the case of the heat rejection to the water cooled condenser receiver 11 this heat energy may be passed into an insulated storage tank 12 where it may be retained until such time as the control system demands the collection of this dormant energy via the heat exchanger 3.

In operation, from the refrigerant compressor the discharge gas at high temperature may be directed to either the air cooled condenser 10 or the water cooled condenser receiver 11 dependent upon the positions of two solenoid valves 13, 14, either one of which, according to circumstances, is opened by virtue of the system controller. In both instances the resultant condensed liquid refrigerant is collected within the condenser receiver 11.

The liquid refrigerant, sub-cooled, then passes through the liquid line 15, filter dehydrator 16 and sight glass, 17 finally into either the fin and tube multipass forced air flow evaporator 2 or into the shell and tube water chiller 3, dependent upon the automatic selection of the liquid line solenoid valves 7 or 8 by the system controller. The superheated evaporator or chiller refrigerant vapour is then passed along a common suction line to the compressor 9. The compressor 9 is preferably of variable capacity with the capacity being controlled by the system controller to optimise the efficiency of the compressor. For example, the compressor may have a number of stages, say four, which are successively brought into operation as the load on the compressor increases.

By virtue of the operation of mechanical damper unit 6 either fresh air or the humid air returning from the controlled space or a variable mixture of the two may be induced through the air cooled evaporator 2 by the return air fan assembly 19, the setting of the damper 6 being selected by the system controller. In the event of the fresh air or humid space air even in a mixed sense, being incapable of providing an acceptable heat source, primarily due to its low temperature, then the water chiller 3 is automatically brought into use, the water to be cooled and thus heat reclaimed therefrom being extracted either from the heat storage tank 12 by virtue of pump 23 operation or from the second liquid source 20 the supply of which is delivered by a pump 21. The second liquid source 20 may be a well such as an artesian well, a river or stream, pond or lake or any other suitable source.

The air supply to be heated prior to being passed into the controlled space via the supply air fan 25 may be either recirculated evaporator-cooled air, fresh air or recirculated uncooled space air via a damper system 18 automatically controlled by the system controller which receives signals representing the fresh air ($T_3$) and space air ($T_2$) temperature and the cooled return air supply $T_5$ from appropriate sensors and uses these to select and use the warmest air source for reheat.

Any residual heat available may be passed to the heat storage tank 12 by means of the water being pumped through the condenser receiver 11 by a pump 22. At no time are water pumps 22 and 23 operated simultaneously, pump 23 being provided to deliver water from the tank 12 to the chiller 3.

The system controller has associated with it a number of sensors to sense the temperature $T_1$–$T_7$ and the relative humidity $Rh_2$ and appropriate interfacing circuitry to control the operation of the solenoid valves, pumps, compressor and fans so as to cause programmed responses to changes in the sensed variables.

The initiation of the stages of heat pump compressor 9 operation is by dry bulb sensing of the controlled space temperature requirement.

The selection of the air stream from which heat is to be recovered is by damper 6 dictated by the relative humidity $Rh_2$ of the space air as sensed by the relative humidity sensor located within the controlled space.

Figure 2:
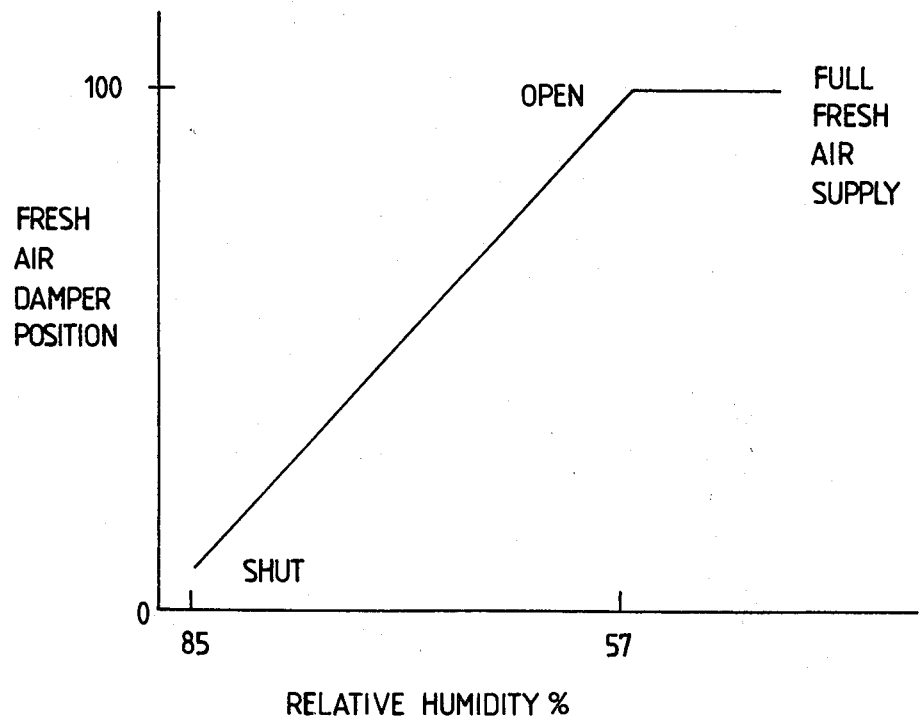
FIG. 2 shows the operating characteristic of part of the system of FIG. 1.

If the relative humidity value $Rh_2$ is less than a prescribed percentage (adjustable) then the damper 6 is driven fully open thus allowing fresh air to enter the evaporator 2, the barometric damper section at the inlet from the controlled space air inlet closing. As the relative humidity value rises the damper 6 is driven shut until at a prescribed maximum value which is adjustable, the air supply to the evaporator 2 is all from the controlled space. FIG. 2 shows the variation of setting of the damper 6,18 with relative humidity $Rh_2$. If the temperature of the mixed air stream from the fresh air source or the controlled space source at $T_4$ is less than 4 deg Centigrade then dampers 6, 23 and 24 close and the return air fan 19 is stopped. When sensor $T_3$ which is measuring the temperature of the ambient air, rises to 5 deg centigrade then the return air fan 19 restarts, the controller opens the dampers 6, 23 and 24 and the heat extraction source is from the air cooled evaporator 2.

When temperature $T_4$ has fallen to less than 4 deg C., the temperature $T_1$ of the water in the heat storage tank 12 is monitored and if this temperature is in excess of 6 deg C. then the cooling source is switched to the chiller 3 by operation of the solenoid valves 7 and 8, and the water pump 23 is switched on. In the event that this heat storage tank temperature drops to 5 deg C. then the heat recovery can be transferred to the alternative water source 20 if it is available and is initiated by stopping pump 23 and activating pump 21.

If subsequently the space temperature $T_2$ is still below the set point then in the absence of any of the evaporator heat sources being available, the heat pump is switched off and the heating demand is automatically transferred to an emergency heat source such as an electrical, gas or oil heater.

The supply air fan 25 remains running, damper 18 is driven open and the circulating air flows within the controlled space are maintained on a full recirculation basis to ensure even temperatures are maintained within the space.

When under normal operation the heat pump unloads as the space temperature $T_2$ rises to the set point then the heat pump will be shut down by the system controller after the latter has ascertained whether it is necessary to increase the energy in the heat storage tank 12 and the supply air fan 25 continues to blow, maintaining said air circulation.

When the space temperature $T_2$ rises beyond the set point then the heat pump will or may reinitiate on first stage of the compressor, damper 18 shuts and the controller monitors sensors $T_3$ and $T_5$ proportionally and the dampers 23 and 24 modulate to return the warmest air stream back to the controlled space via the supply air fan 25. At the same time the condenser changeover solenoid values 13 and 14 are operated and the water pump 22 starts, the available heat then being transferred to the heat sink storage tank 12 for future use, until this storage temperature $T_1$ reaches a prescribed maximum when all stages of the heat pump are shut down, dampers 18 and 6 open, and 23 and 24 shut, the return air fan 19 stops and the supply air fan 25 continues to maintain recirculation of controlled space air.

Reference should be made to Appendix 2 and 3 which illustrates the basic control elements.

It should be noted that for a large deviation of $T_2$ below the set point the controller could re-activate the emergency heat source.

Numerous modifications of the above apparatus will be apparent. For example, the alternative water supply 20 and the provisions therefor may be omitted if no suitable source is available. Equally, the storage tank 12 could be omitted in which case the condenser receiver 11 could be omitted also.

We claim:

1. An environmental control system comprising in combination: a non-reverse cycle heat pump, said heat pump including means for selectively extracting heat from a plurality of different heat sources, at least one of said sources being an airstream, said means including an evaporator for extracting heat energy from an air stream through which recirculated space air, fresh air, or mixtures thereof may be circulated; means for selectively rejecting the extracted heat into an air stream to provide heated environmental space air; means for recovering at least a portion of the rejected heat and utilizing the same to increase the heat content of at least one of said heat sources; and control means for selecting the heat sources and uses of the extracted heat in accordance with prevailing conditions and arranged so that, when available, heat is preferentially extracted from said air-stream source, said control means including means for selecting fresh air, recirculated space air, or a 2. A system as claimed in claim 1 including means to determine the proportions of fresh air and re-circulated space air in said mixture in accordance with the relative humidity of the space air.

3. A system as claimed in claim 1 including a condenser in said heat pump for delivering heat energy to a stream of air to be delivered to said control space, a thermally insulated storage tank and a condenser-receiver for delivering heat energy to water in said storage tank, and wherein an air stream out-flow from said evaporator is connected to said condenser for delivery to the controlled space.

4. A system as claimed in claim 3 including means to supply a further stream of air to said condenser for delivery to said controlled space.

5. A system as claimed in claim 4 including a damper arrangement for selectively supplying fresh air or recirculated air as said further air stream.

* * * * *

UNITED STATES PATENT AND TRADEMARK OFFICE
CERTIFICATE OF CORRECTION

PATENT NO. : 4,414,818
DATED : November 15, 1983
INVENTOR(S) : Alan Michael Turbard and Peter Neville Foley It is certified that error appears in the above—identified patent and that said Letters Patent is hereby corrected as shown below:

Column 4, line 52, complete Claim 1 by inserting after "or a" -- mixture of the two, through said evaporator. --

Signed and Sealed this

Thirty-first Day of January 1984

[SEAL]

Attest:

GERALD J. MOSSINGHOFF

Attesting Officer

Commissioner of Patents and Trademarks